United States Patent [19]

Dunk

[11] 4,230,475

[45] Oct. 28, 1980

[54] CERAMIC ROLL DRIVE AND SUPPORT MECHANISM AND A METHOD OF USING SAME

[75] Inventor: Ronald G. Dunk, Hepworth, Canada

[73] Assignee: PPG Industries, Inc., Pittsburgh, Pa.

[21] Appl. No.: 17,213

[22] Filed: Mar. 5, 1979

[30] Foreign Application Priority Data

Feb. 20, 1979 [CA] Canada ................................ 321883

[51] Int. Cl.² .......................................... C03B 25/04
[52] U.S. Cl. ...................................... 65/118; 65/348; 65/374 RM; 29/115
[58] Field of Search .................. 65/27, 118, 348, 349, 65/350, 351, 374 RM; 29/115, 116 R, 116 AD

[56] References Cited

U.S. PATENT DOCUMENTS

| | | | |
|---|---|---|---|
| 1,593,567 | 7/1926 | Brynes ....................... 65/374 RM X |
| 2,531,984 | 11/1950 | Millar .................................. 198/127 |
| 2,671,262 | 3/1954 | Kuniholm ............................ 29/123 |
| 2,890,517 | 6/1959 | Mengel ........................... 29/117 X |
| 3,141,756 | 7/1964 | Giffen ....................... 65/374 RM X |
| 3,338,569 | 8/1967 | Cuvelier .............................. 432/246 |
| 3,489,397 | 1/1970 | Alexander ...................... 29/115 X |
| 3,608,876 | 9/1971 | Leaich ................................... 263/6 |
| 3,867,748 | 2/1975 | Miller ................................... 29/115 |
| 3,879,786 | 4/1975 | Larkin ............................... 29/115 X |
| 3,881,234 | 5/1975 | Crowell et al. ........................ 29/115 |
| 3,994,380 | 11/1976 | Hope et al. ...................... 29/117 X |
| 4,034,837 | 7/1977 | Vinarcsik et al. ..................... 29/110 |
| 4,057,411 | 11/1977 | Reese ................................ 65/349 X |

*Primary Examiner*—Arthur D. Kellogg
*Attorney, Agent, or Firm*—Dennis G. Millman; Edward I. Mates

[57] ABSTRACT

A rotatable roll for conveying glass sheets during thermal treatment comprising a frangible ceramic roll of cylindrical configuration engaged in compression stress between a pair of metal spindles, one of which is coupled to drive means for rotation and both of which spindles are provided with heads approximately coextensive in cross-section with the end surfaces of the frangible ceramic roll. The interfacial surfaces between the end surfaces of the rolls and the heads of the spindles are provided with friction material. The other of said pair of metal spindles is biased in compression to apply axial compression stress to the ceramic roll while the latter rotates in unison with the spindles. A method of using a conveyor comprising at least some of said ceramic rolls for the thermal treatment of glass sheets is also described.

10 Claims, 8 Drawing Figures

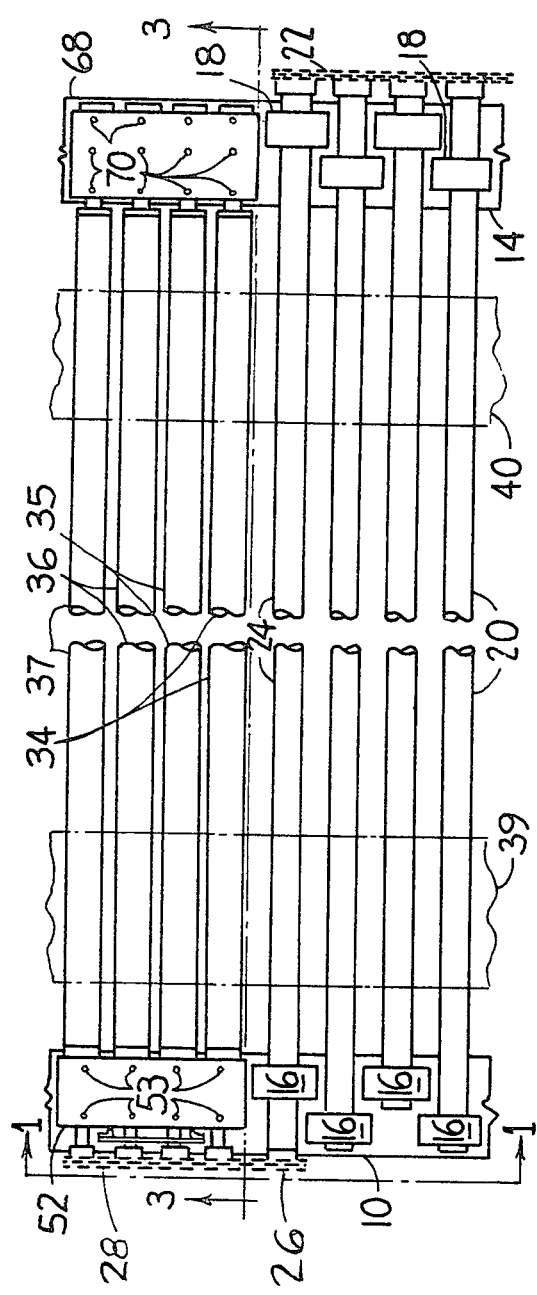
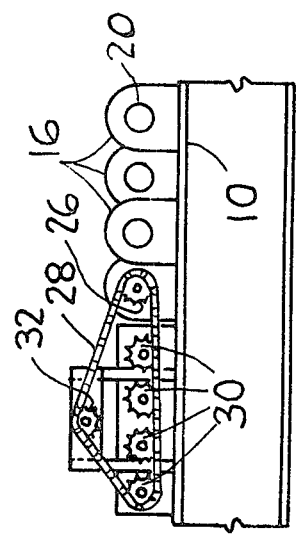
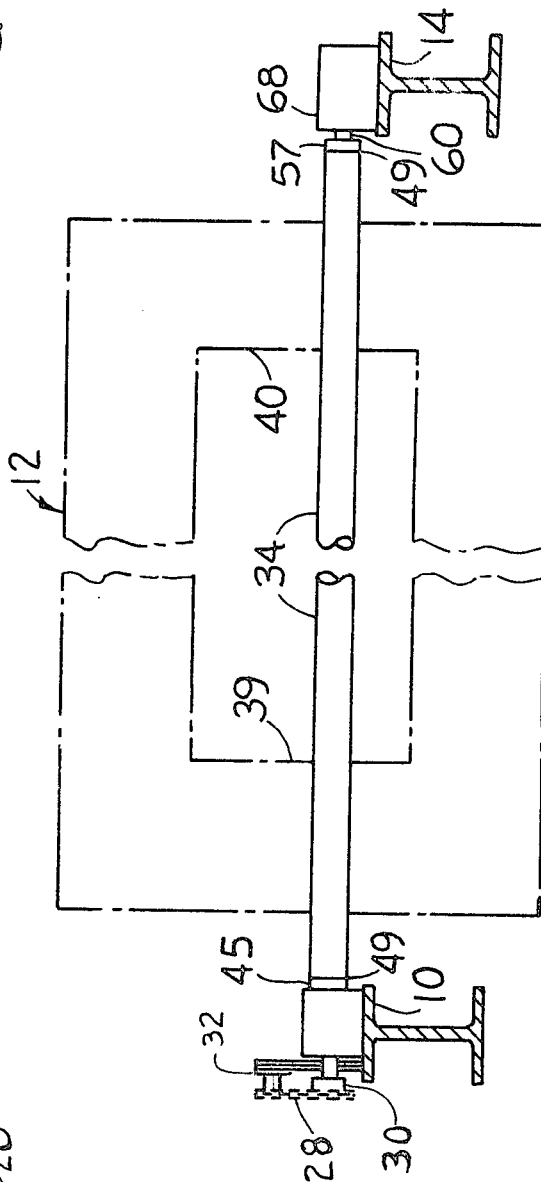

CERAMIC ROLL DRIVE AND SUPPORT MECHANISM AND A METHOD OF USING SAME

BACKGROUND OF THE INVENTION

1. Field of the Invention

The present invention relates to supporting glass sheets and, more particularly, to improved means for applying a rotational force to rotate frangible ceramic rolls in a roller hearth conveyor within a heated furnace. The present invention also relates to using such rolls to convey glass sheets during thermal treatment.

It has been customary to use rotating metal rolls to convey glass sheets and other materials through tunnel-like furnaces for heat treatment. Recently, more frangible ceramic rolls have been used because they do not mar the glass sheets that are conveyed by frictional rotation thereover through a heat treatment zone where the glass sheets are initially heated to a temperature sufficient for further processing and then cooled during their further processing.

A typical heat treatment operation involves tempering glass sheets. When glass sheets are tempered, they are heated to an elevated temperature considerably higher than the strain point of the glass. The hot glass is then chilled rapidly to impart a stress pattern throughout the thickness of the glass. The stress pattern is such that the surface portions of the glass are stressed in compression and the interior of the glass within the surface portions is stressed in tension.

Glass sheets that develop a stress distribution comprising a skin of compression stress surrounding an interior stressed in tension become tempered to produce a glass product much stronger than untempered glass. Tempered glass is less likely to shatter than untempered glass when struck by an object. Furthermore, in the less frequent times when an outside force is sufficiently large to cause tempered glass to fracture, tempered glass breaks up into a large number of relatively smoothly surfaced, relatively small particles which are far less dangerous than the relatively large pieces with relatively jagged edges that result from the more frequent fracture of untempered glass.

To promote efficient and large scale production, discrete glass sheets are conventionally heated and cooled while being moved continuously along a fixed path and successively through a heating section, a quenching section and a cooling section. The path is defined by a common upper tangent of rotating conveyor rolls, each of which is longitudinally spaced from one another along the length of the path and each of which extends transversely across said fixed path.

To achieve satisfactory temper, the temperature of the glass sheet must be above a predetermined minimum level so as to maintain the core or interior thereof above a deformation temperature upon being exposed initially to the quenching medium of the quenching section. The residual heat remaining in glass sheets should be sufficient for immediate advancement to the tempering area and exposure to the quenching medium.

Glass sheets that are rotated on relatively fragile ceramic conveyor rolls during tempering are less likely to develop a defect known as roll ripple distortion than glass sheets that are conveyed on stainless steel rolls. However, since roll ripple distortion is associated primarily with a critical portion of the apparatus adjacent the exit of the furnace and in the entrance to the further treatment zone wherein the glass sheets are at their maximum temperature and highly susceptible to roll ripple distortion, it has been found practical to limit the substitution of the relatively expensive ceramic rolls for the less expensive metal rolls of the prior art to the aforementioned critical portion of the conveyor.

Ceramic conveyor rolls in high temperature regions are preferable to metal rolls for several reasons. One of these reasons is that the ceramic rolls expand less thermally. Metal rolls tend to sag or buckle at elevated temperatures and fail to provide a straight line of support in the tangential plane common to the upper portions of the circumferences of the rotating rolls. The tendency of ceramic rolls to be brittle and fracture more readily than metal rolls has caused the glass sheet heat treatment industry to search for a combination roll for conveyors usable in high temperature furnaces that combine the best characteristics of ceramic rolls with the best characteristics of metal rolls.

2. Description of the Prior Art

U.S. Pat. No. 3,338,569 to Cuvelier discloses a ceramic roll drive system for a tunnel-like furnace. The system incorporates a series of ceramic rolls arranged side-by-side for conveying materials through the furnace. Spindles extend into the tunnel from opposite sides and project into the opposing ends of the respective ceramic rolls to support the latter. A suitable drive system is provided to rotate the spindles. The spindles actually extend into axially disposed holes provided in the opposing ends of the ceramic rolls. Presumably, there is a slight interfit therebetween to permit the driven spindle to positively rotate the ceramic roll.

The ceramic roll of the conveyor is hollowed out to telescopically receive the inner ends of a driven spindle. The length of the hollowed out enlarged end portion is sufficient to permit some longitudinal expansion in an axial direction of the spindle or the ceramic roll forming part of the furnace.

U.S. Pat. No. 3,489,397 to Alexander discloses a roller hearth furnace in which the individual rolls of the roller hearth conveyor are driven by respective sprockets. Each sprocket is drivingly connected to its associated roll via a U-shaped spring arrangement that provides a friction drive. Each ceramic roll is received at each end in a sleeve 17 that is journaled for rotation in a bearing.

U.S. Pat. No. 3,608,876 to Leaich discloses a system of coupling ceramic rollers to driving and supporting shafts by uniquely arranged pin and slot connections which coact with the supporting shafts to effect a positive rotational drive to each of the conveyor rolls.

U.S. Pat. No. 3,867,748 to Miller discloses a ceramic roll drive system for use in a heating furnace that includes metal end caps positioned on the opposing ends of the ceramic roll. Each end cap is provided with an annular recess that receives a supply of a heat expandable adhesive material. The adhesive material thus contacts and engages with peripheral portions of the opposing ends of the roll. This reference also discloses a compression spring arrangement for applying axial forces to the roll and its mounting assembly including the end caps. The arrangement maintains the conveyor rolls, the hubs, the end caps and ceramic tube of each roller assembly pressed together in the desired relationship. Presumably, this arrangement also serves to take up and allow for thermal expansion.

None of the aforesaid references take advantage of the fact that ceramic material used in roller hearth conveyor rolls is exceedingly strong in compression so as to provide a combination of a compressive force and friction facings between metal supporting elements and a ceramic roll in the axial direction of the roll. The adhesive provided in the Miller patent is applied between adjacent circumferential surfaces. This tends to develop a tortional stress in tension which tends to cause fracture of the ceramic rolls.

U.S. Pat. No. 4,057,411 to Reese discloses a roller hearth conveyor that has rolls only in a critical portion of the conveyor maintained in more precise alignment to reduce roll ripple distortion to a considerable extent.

Other references reported in a novelty search of the present invention include U.S. Pat. Nos. 2,531,984 to Millar; 2,671,262 to Kuniholm; 2,890,517 to Mengel; 3,111,823 to Heinz Kater; 3,879,786 to Larkin; 3,881,234 to Crowell et al; 3,994,380 to Hope et al; and 4,034,837 to Vinarcsik et al. None of these additional references are believed to be as pertinent as those which were discussed earlier.

SUMMARY OF THE INVENTION

The present invention provides apparatus for transporting a glass sheet along a path of travel through an enclosed, heated, tunnel-like furnace comprising a rotatable conveyor roll extending transversely of said path of travel for rotation about an axis extending transversely of said path. The conveyor roll comprises a ceramic roll of cylindrical configuration having an elongated recess extending longitudinally inward from each end thereof in axial alignment therewith. A rotatable metal spindle is aligned with each end of the ceramic roll. An alignment pin extends axially inward from each said spindle into one or the other of said recesses and is axially aligned with its associated spindle and recess. One of the spindles has an outer axial end drivingly connected to drive means to rotate the one spindle. Means abuts the axial outer end of the other spindle to apply a compression force in the axial direction of the ceramic roll, whereby the ceramic roll rotates in axial compression in unison with the spindles when the drive means rotates the one spindle. The ceramic roll has a pair of end surfaces extending transverse to the axial direction. A coating of friction material is applied to each of the end surfaces. Each spindle is provided with a head at the axially inner end thereof. The head has a recessed surface facing axially inward. A coating of friction material is applied to each of the recessed surfaces. In this manner, the end surfaces of the ceramic roll and the recessed surfaces of the heads are interfaced with friction material to improve the rotating driving force in a compression direction for rotating the ceramic roll that supports the glass sheet for movement along the path of travel.

In a specific embodiment of the present invention, the recessed surfaces on the head are pocked with additional spaced recesses and additional friction material is applied within the additional recesses. Additional means to adjust the axial compression force along the length of the ceramic roll is provided. The friction material is preferably a silicone.

The apparatus of a specific embodiment of the present invention includes a bearing block that encloses the means to apply a compression force in the axial direction. The bearing block has an inner diameter larger than the outer diameter of the ceramic roll, of the spindles and their respective heads, and of the compression force applying means to enable the ceramic roll to be removed and replaced readily through the bearing block.

In transporting a plurality of glass sheets along the path of travel, a series of rotatable conveyor rolls comprising ceramic cylindrical rolls are spaced longitudinally along the path of travel. The conveyor rolls comprising ceramic rolls with cylindrical configuration are preferably located along a portion of the path wherein the glass sheets are at relatively high temperatures. Metal conveyor rolls may be provided along another portion of the path where it is not so critical for the glass sheets to avoid the defect known as roll ripple distortion.

The means to apply a compression force comprises a compression spring in the preferred embodiment of this invention. Means is provided to adjust the compression of the compression spring to the desired compression which is not so great as to provide undue compression on the ceramic roll and not less than required to permit the compression spring to accommodate itself to changes in expansion and contraction of the associated ceramic roll as the furnace temperature conditions vary.

In the specific embodiment of the present invention, a plurality of special ceramic rolls is provided in a roller hearth type of furnace that has been provided previously entirely throughout its entire length with steel rolls. It is understood that the entire length of the furnace may be provided with ceramic rolls mounted as depicted herein. However, for the purpose of minimizing capital expense, in view of the fact that ceramic rolls are more expensive than steel rolls, operations are improved significantly when the furnace is provided with ceramic rolls in the critical portion of the furnace where the glass sheets attain their maximum temperature, which is in the vicinity extending from immediately upstream of the furnace exit to immediately downstream of the furnace exit, as explained in U.S. Pat. No. 4,057,411 to Thomas J. Reese.

DESCRIPTION OF THE DRAWINGS

In the drawings that form part of an illustrative embodiment of the present invention, FIG. 1 is a side view of a driving system for coupling the rotation of a plurality of special ceramic rolls conforming to the present invention with the operation of conventional metal rolls used in a portion of a typical roller hearth furnace;

FIG. 2 is a fragmentary plan view of the portion of the furnace depicted in FIG. 1 looking down upon a series of conventional rolls and four special ceramic rolls which have been substituted for conventional rolls in a critical portion of a roller hearth furnace to provide an experimental environment for testing the special ceramic rolls conforming to the present invention;

FIG. 3 is a fragmentary, cross-sectional view of the roller hearth furnace of FIGS. 1 and 2, taken along the line 3—3 of FIG. 2, showing the special ceramic roll as modified according to the present invention;

DESCRIPTION OF AN ILLUSTRATIVE EMBODIMENT

Figure 4:
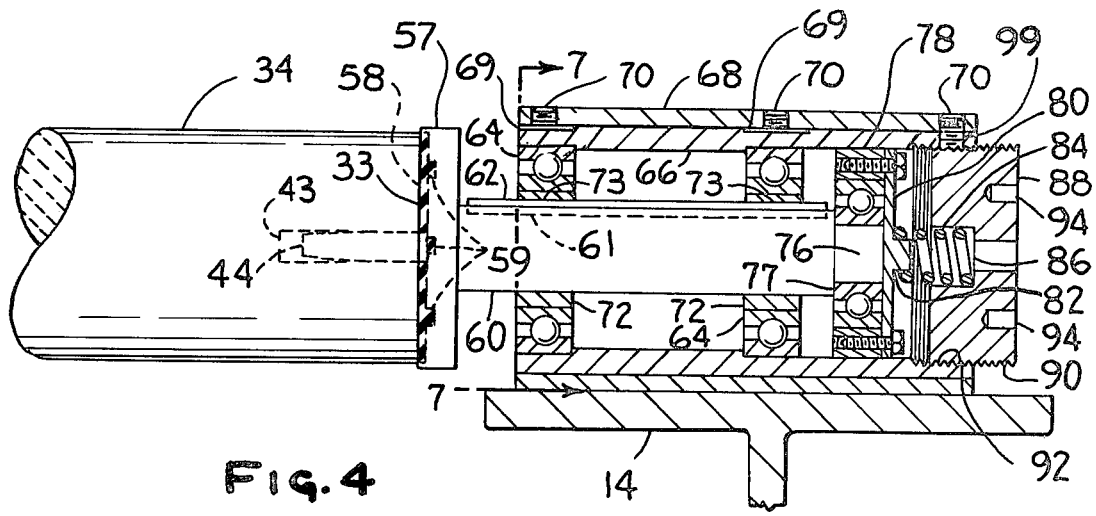
FIG. 4 is an enlarged elevational side view of the right end of one of the special ceramic rolls of FIG. 3, showing its relation to an alignment pin, a spindle, and depicting in cross-section a bearing housing and adjustable compression spring means of a preferred embodiment of the present invention.

Referring to the drawings, a longitudinally extending, horizontal I-beam 10 is shown to the left side of a tunnel-like furnace 12 and another longitudinally extending horizontal I-beam 14 is disclosed to the right side of the furnace as seen in the view of FIG. 3. The horizontal I-beam 10 supports a plurality of bearing housings 16. Adjacent of said bearing housings are offset from one another transversely of the length of the I-beam 10 to increase the density of bearing housings along its length. The horizontal I-beam 14 supports additional bearing housings 18 in a similar transversely offsetting manner. Each bearing housing 16 is aligned with a corresponding bearing housing 18 to receive the opposite end portions of one of a series of steel rolls 20. Offsetting adjacent bearing housings permits adjacent rolls 20 to be located as closely as possible using standard bearing housings that are available commercially.

To the outside of the bearing housings 18, each of the rolls 20 is provided with a sprocket that is connected to a driving chain 22. A downstream steel roll 24 is provided with an additional sprocket 26 outside of its bearing housing 16 for connection to a drive chain 28 that engages a plurality of special sprockets 30, four of which are illustrated. Chain 28 is also entrained over an idler sprocket 32 to ensure proper tension for the drive chain 28.

Each special sprocket 30 is fixed to a shaft frictionally connected to the left end of one of a series of special ceramic rolls 34, 35, 36 or 37. The special sprockets 30 are constructed and arranged relative to the additional sprocket 26 to provide a peripheral speed for the plurality of special ceramic rolls 34, 35, 36 and 37 equal to the peripheral speed of the conventional steel conveyor rolls 20 and the downstream steel conveyor roll 24. The special rolls 34 to 37 are of ceramic composition (preferably quartz) to minimize surface marking of glass sheets conveyed thereof by rotation at high temperatures.

The diameter of the ceramic rolls 34, 35, 36 and 37 in a preferred embodiment of this invention is 2 inches (5.08 cm). The ceramic rolls extend across the width of the furnace 12 and are arranged in parallel relationship with a center to center distance in the longitudinal direction of the furnace of 2.5 inches (6.35 cm). The conventional steel rolls 20 and 24 are arranged at center to center distances of 3.5 inches (8.89 cm) and have an outer diameter of 1 7/16 inch (3.65 cm).

The conventional steel rolls 20 and 24, which remain in a non-critical portion of the furnace, have no provision for yielding to thermal expansion. Consequently, the steel rolls tend to warp due to thermal expansion. Furthermore, steel rolls oxidize at the elevated temperatures prevailing in the furnace and develop an oxide scale that must be removed periodically to avoid having the scale mar conveyed heat-softened glass sheets.

Figure 5:
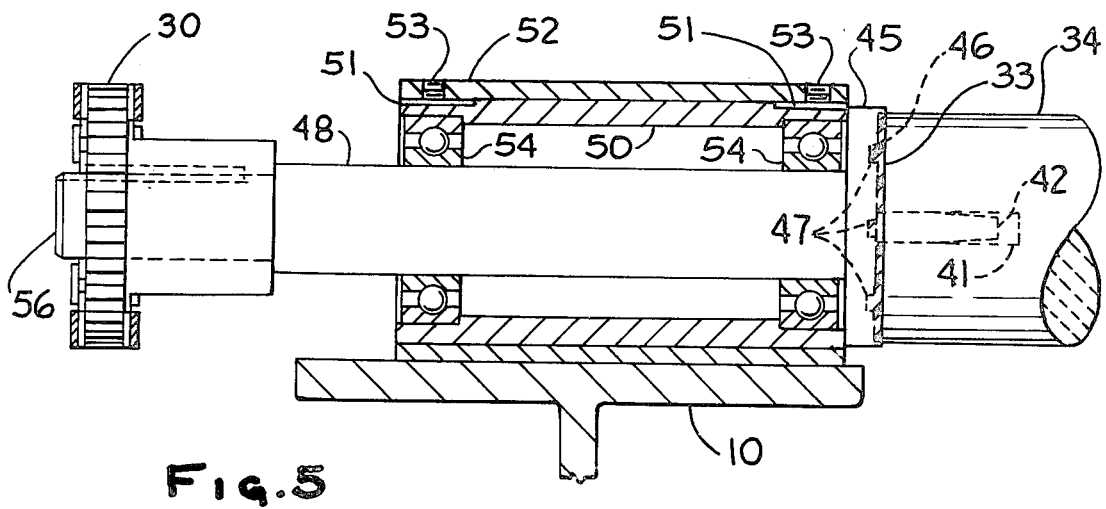
FIG. 5 is a view similar to that of FIG. 4, of the left-hand end of the special ceramic roll shown in FIG. 3, showing its relation to an alignment pin and a spindle, and depicting in cross-section a bearing housing for receiving the spindle, and showing spindle drive means that imparts a torque to rotate the special ceramic roll by friction through the spindle, a head for said spindle and an end surface of said roll.
Figure 6:
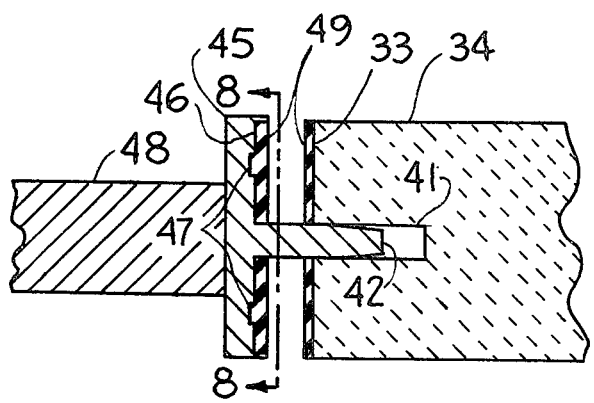
FIG. 6 is a fragmentary, exploded, cross-sectional view of adjacent structural elements shown in FIG. 5, with the elements separated to show how their interfacial facing surfaces are coated.
Figure 7:
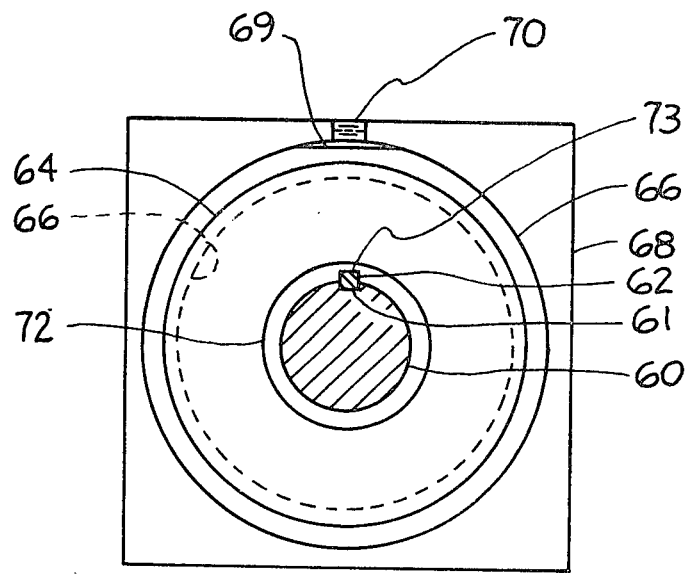
FIG. 7 is a cross-sectional view taken along the line 7—7 across a bearing block and spindle forming part of the structure shown in FIG. 4.

The special ceramic rolls 34, 35, 36 and 37 of the present invention are constructed of solid cylindrical shafts and extend through openings in the opposite side walls 39 and 40 of the tunnel-like furnace 12 to form opposite end surfaces 33 (FIGS. 4 to 6). The opposite ends of the special ceramic rolls are engaged by friction by heads fixed to rotating spindles rotatably supported in bearing sleeves within bearing housings carried by I-beams 10 and 14 laterally outside walls 39 and 40 of the furnace 12 in a manner to be described in detail.

Figure 8:
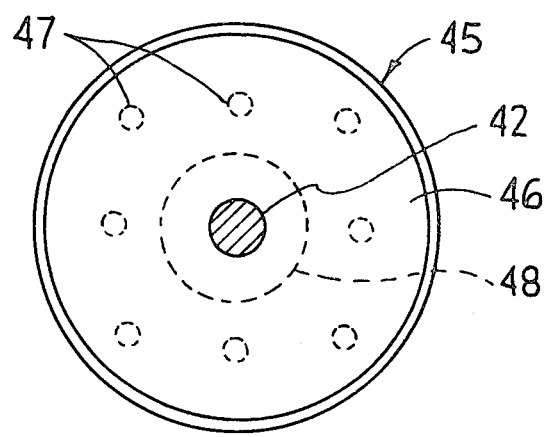
FIG. 8 is an end view of a head taken along the line 8—8 of FIG. 6.

The left-hand end of each of the ceramic rolls 34 to 37 is provided with a centrally located, axially extending recess 41 adapted to receive an alignment pin 42 (see FIG. 5). The other end of each of the ceramic rolls is provided with a similar centrally located, axially extending recess 43 adapted to receive a similar alignment pin 44 (See FIG. 4). Alignment pin 42 is provided with an enlarged head 45 (FIGS. 5, 6 and 8) approximately coextensive in cross-section with said end surface 33 and faced with friction material 49. The left end surface 33 of ceramic roll 34 is also faced with friction material 49 so as to enable the head 45 to have a large area of frictional engagement against the left-hand end surface 33 of the ceramic roll 34. A suitable friction material is a silicone composition such as one available from General Electric under the brand name RTV-60.

The head 45 is fixed at its outer surface to a spindle 48 of smaller diameter than the head 45 which extends axially outward from the ceramic roll 34 through a bearing sleeve 50 having flat surface portions 51 and mounted within a bearing block 52. The latter is provided with internally threaded apertures 53 aligned with corresponding flat surface portions 51 of the bearing sleeve 50 to receive locking screws (not shown). A pair of bearings 54 have inner races press fit around spindle 48 to rotate relative to the bearing sleeve 50. Spindle 48 has an outer end portion 56 that is keyed to one of the special sprockets 30 so that the special sprockets and the drive chain 28 provide driving means to rotate the spindle 48.

The other alignment pin 44 extends laterally inward from an enlarged head 57. The latter is similar to the head 45 and comprises a recessed surface 58 with additional recesses 59 (See FIG. 4). Friction material is applied to the recessed surface 58 and additional recesses 59 and also to the right end surface 33 of ceramic roll 34, as shown in FIGS. 4 and 6.

A spindle 60 extends outwardly from and is fixed to the outer surface of the enlarged head 57. The spindle 60 has a smaller diameter than the head 57 and is provided with a keyway 61 that receives a key 62. The key and keyway extend parallel to the axis of the ceramic roll 34. A pair of bearings 64 is provided with a bearing sleeve 66 that surrounds spindle 60.

The bearing sleeve 66 is located within a bearing block 68 and is provided with two flat surface portions 69 aligned with the inner two of three apertures 70 in the bearing block 68. The apertures 70 are internally threaded to receive locking screws (not shown). A bushing 72 having a keyway 73 to accept the key 62 is press fit to the inner race of each of bearings 64 to provide a rigid connection between the spindle 60 and the inner race of each of the bearings 64.

Bearing block 68 rests on the horizontal I-beam 14. Spindle 60 has a reduced outer end 76 surrounded by a thrust bearing 77, whose outer race is within a thrust bearing housing 78.

An end mounting plate 80 is attached to the thrust bearing housing 78. The center of the outer surface of the end mounting plate 80 is enlarged to provide a locator pin 82. The latter receives the inner end of a compression spring 84. The latter serves as means to apply a compressive force in the axial direction to the ceramic roll 34.

The outer end of the compression spring 84 is received within a recess 86 of a compression adjustment plug 88. The compression adjustment plug 88 is externally threaded at 90 to be screw threadedly arranged with respect to internal threads 92 on the inner surface of the outer end portion of the bearing sleeve 66. A plurality of pin receiving holes 94 is provided in the outward facing wall of the compression adjustment plug 88 to receive a tool to enable the plug 88 to be rotated to change its axial position relative to the length of the associated ceramic roll 34. This latter arrangement provides means to adjust the axial compression force along the length of ceramic roll 34.

Each of the outermost internally threaded apertures 70 in bearing block 68 is aligned with an internally threaded aperture 99 at the laterally outer portion of a corresponding bearing sleeve 66. A locking bolt (not shown) is adapted to be threadedly engaged by the aligned threaded apertures 70 and 99 to engage the peripheral surface of the compression adjustment plug 88 to insure that the adjusted compression force of the compression spring 84 is not changed during operation. Whenever it is necessary to change the compression of the compression spring 84, the locking bolt is loosened temporarily for adjustment of the axial position of the compression adjustment plug 88 and then is retightened to lock the compression adjustment plug into its modified position. When retightened, the locking bolt and aligned internally threaded apertures 70 and 99 associated with each special ceramic roll 34 to 37 cooperate with the compression adjustment plug 88 to provide means to maintain a constant axial compression force through said compression spring 84 on said associated ceramic roll during operation.

Both end surfaces 33 of the ceramic roll 34 are provided with a frictional facing 49. The recessed surfaces 46 and 58 and the additional recesses 47 and 59 of the heads 45 and 57 are also provided with a friction facing 49 that faces a friction facing on the end surfaces 33 of ceramic roll 34. Thus, the frictionally faced surfaces 33, 46 and 58 extend normal to the direction of compression force resulting from adjustment of the compression spring 84 in the axial direction of the ceramic roll 34. This axially directed compressive force and the friction facings facilitates rotation of the ceramic rolls 34-37 in response to rotation of the special conveyor roll sprockets 30. This construction avoids having a metal end cap adhered to the peripheral surface at each end of the ceramic roll, which adhesion causes a twisting force on the ends of the conveyor roll that may cause breakage. Having the adhesion on facing surfaces normal to the axis of the ceramic rolls reduces the tendency of the ceramic roll to twist.

The inner radius of the bearing block 68 is slightly greater than the outer radius of the ceramic roll 34 and of the head 57 aligned therewith as well as of the other head 45. Therefore, when a ceramic roll requires replacement, it is a simple matter to unscrew the threaded bolts attaching the bearing sleeve 66 to the bearing block 68 and to remove the ceramic roll 34 through the bearing block 68. The bearing block 52, the spindle 48 and its attached head 45 and alignment pin 42 remain in position on the horizontal I-beam 10 when the ceramic roll 34, 35, 36 or 37 is being removed through bearing block 58 for replacement. Application of additional friction material to the mating end surfaces 33 at the ends of the ceramic roll 34 and the recessed surfaces 46 and 58 of the heads 45 and 57 makes it possible to renew a frictional driving connection to the ceramic roll from the special sprockets 30 via the spindle 48, and the head 45 to the left end surface 33 of the ceramic roll.

Since the ceramic roll is composed of fused silica, the amount of longitudinal thermal expansion due to temperature changes in the furnace 12 is minimal. However, there is some longitudinal thermal expansion of the ceramic rolls which is taken up by the corresponding compression spring 84 operatively connected to the right end thereof.

When a new ceramic roll 34, 35, 36 or 37 is installed, it is provided with a facing surface of friction material 49 at its left end surface 33 and the recessed surface 46 of the head 45 including the additional recesses 47 are also treated with frictional material 49. The roll is inserted through the bearing block 68 and extended across the width of the furnace 12 until the facing surfaces 33 and 46 coated with friction material 49 are engaged. Adjustment of the compression of the compression spring 84 is made possible by rotating the compression adjustment plug 88 to the desired compression. The latter is not so great as to provide undue compression upon the ceramic roll 34 and yet is sufficient to permit the compression spring 84 to accommodate itself to changes in expansion and contraction of the attached ceramic roll as the furnace temperature conditions vary.

In the specific embodiment of the present invention, a plurality of special ceramic rolls 34 to 37 has been provided in a roller hearth type of furnace that has previously provided throughout its entire length with steel rolls. It is understood that the entire length of the furnace may be provided with ceramic rolls mounted as previously described. However, for the purpose of minimizing capital expense, in view of the fact that ceramic rolls are more expensive than steel rolls, operations are improved significantly at relatively little capital expenditure when the furnace is provided with a limited number of ceramic rolls in the critical portion only of a roller hearth furnace where the glass sheets attain their maximum temperature. This critical region usually extends from immediately upstream of the furnace exit to immediately downstream of the furnace exit, as explained in U.S. Pat. No. 4,057,411 to Thomas J. Reese.

The form of the invention shown and described in this disclosure represents an illustrative preferred embodiment and certain modifications thereof. It is understood that various changes may be made without departing from the gist of the invention as defined by the claimed subject matter that follows.

I claim:

1. Apparatus for transporting a glass sheet along a path of travel through an enclosed, heated, tunnel-like furnace comprising a rotatable conveyor roll extending transversely of said path of travel for rotation about an axis extending transversely of said path, said conveyor roll comprising a ceramic roll of cylindrical configuration, an elongated recess extending longitudinally inward from each end of said ceramic roll in axial alignment therewith, a rotatable metal spindle axially aligned with each end of said ceramic roll, an alignment pin extending axially inward from each said spindle into one or the other of said recesses and axially aligned with said associated spindle and recess, one of said spindles having an outer axial end, drive means drivingly connected to said outer axial end of said one spindle to rotate the latter, means abutting the axial outer end of the other spindle to apply a yieldable compressive force in the axial direction of said ceramic roll, said ceramic roll having a pair of end surfaces extending transverse to said axial direction, a coating of friction material applied to each of said end surfaces, a head approximately coextensive in cross section with said end surfaces at the axially inner end of each said spindle, a recessed surface facing axially inwardly of each said head, and a coating of friction material applied to each of said recessed surfaces to interface said end surfaces of said ceramic roll and said recessed surfaces of said heads with friction material, whereby said ceramic roll rotates in unison with said spindles in axial compression therebetween when said drive means rotates said one spindle.

2. Apparatus as in claim 1, wherein said recessed surfaces are pocked with additional spaced recesses and additional friction material is contained within said additional recesses.

3. Apparatus as in claim 1, further including means to adjust the axial compression force applied to said ceramic roll, and means to maintain said axial compression force constant during operation.

4. Apparatus as in claim 1 or 2, wherein said friction material is a silicone.

5. Apparatus as in claim 1 or 2 or 3, further including a bearing block enclosing said means to apply said yieldable compressive force in said axial direction having an inner diameter larger than the outer diameters of said ceramic roll, said heads, and said compressive force applying means to enable said ceramic roll to be removed and replaced readily through said bearing block.

6. Apparatus for transporting a plurality of glass sheets along said path of travel comprising a series of rotatable conveyor rolls spaced longitudinally along said path of travel, said conveyor rolls including a plurality of rolls as defined in claim 1 or claim 2.

7. Apparatus as in claim 6, wherein said conveyor rolls are located along a portion of said path wherein said glass sheets are at relatively high temperatures and metal conveyor rolls are provided along another portion of said path.

8. A method of conveying a series of glass sheets along a path of travel through a tunnel-like furnace comprising; supporting each glass sheet on the common upper tangential plane of a series of parallel, horizontally spaced, cylindrical, ceramic rolls; propelling the glass sheet along the ceramic rolls by imparting rotation to each ceramic roll about its cylindrical axis by way of a first metallic spindle engaging an end of the ceramic roll; maintaining each ceramic roll in axial compression by applying a yieldable compressive force to the ceramic roll by way of a second spindle engaging the opposite end of the ceramic roll; and maintaining the spindles in frictional engagement with the ceramic rolls by interposing friction material between an end surface at each end of each ceramic roll transverse to the axis of the roll and a parallel, adjacent surface on the respective spindle.

9. The method of claim 8, wherein said path of travel includes a relatively high temperature zone and said glass sheets are conveyed over said rolls of ceramic composition through said relatively high temperature zone and over metal conveyor rolls along another portion of said path.

10. Apparatus for transporting a glass sheet along a path of travel through an enclosed, heated, tunnel-like furnace comprising a rotatable conveyor roll extending transversely of said path of travel for rotation about an axis extending transversely of said path, said conveyor roll comprising a ceramic roll of cylindrical configuration, an elongated recess extending longitudinally inward from each end of said ceramic roll in axial alignment therewith, a rotatable metal spindle axially aligned with each end of said ceramic roll, an alignment pin extending axially inward from each said spindle into one or the other of said recesses and axially aligned with said associated spindle and recess, one of said spindles having an outer axial end, drive means drivingly connected to said outer axial end of said one spindle to rotate the latter, means abutting the axial outer end of the other spindle to apply a yieldable compressive force in the axial direction of said ceramic roll, said ceramic roll having a pair of end surfaces extending transverse to said axial direction, a head approximately coextensive in cross section with said end surfaces at the axially end of each said spindle, a recessed surface facing axially inwardly of each said head, and a layer of friction material applied to each interface between said end surfaces of said ceramic roll and said recessed surfaces of said heads, whereby said ceramic roll rotates in unison with said spindles in axial compression therebetween when said drive means rotates said one spindle.

* * * * *

UNITED STATES PATENT AND TRADEMARK OFFICE
CERTIFICATE OF CORRECTION

PATENT NO. : 4,230,475
DATED : October 28, 1980
INVENTOR(S) : Ronald G. Dunk

It is certified that error appears in the above-identified patent and that said Letters Patent are hereby corrected as shown below:

Column 10, line 44, --inner-- should be inserted after "axially".

Signed and Sealed this

Fifth Day of May 1981

[SEAL]

Attest:

RENE D. TEGTMEYER

Attesting Officer    Acting Commissioner of Patents and Trademarks